(12) United States Patent
Liu et al.

(10) Patent No.: US 7,459,487 B2
(45) Date of Patent: Dec. 2, 2008

(54) POLYMER COMPOSITE MEMBRANE AND METHOD OF MAKING THE SAME

(75) Inventors: Jin Liu, Anhui (CN); Huanting Wang, Summer Hill (AU); Shao-An Cheng, Hangzhou (CN); Kwong-Yu Chan, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 0 days.

(21) Appl. No.: 11/058,994

(22) Filed: Feb. 16, 2005

(65) Prior Publication Data

US 2006/0183809 A1      Aug. 17, 2006

(51) Int. Cl.
    *C08J 5/20*      (2006.01)
(52) U.S. Cl. .............. 521/27; 525/70; 526/59; 210/490
(58) Field of Classification Search ........... 526/59; 210/490; 525/70; 521/27
    See application file for complete search history.

(56) References Cited

U.S. PATENT DOCUMENTS

| | | | | |
|---|---|---|---|---|
| 3,658,946 A | * | 4/1972 | Bronstert et al. ............ | 525/53 |
| 3,660,535 A | * | 5/1972 | Finch et al. ................. | 525/53 |
| 3,926,798 A | * | 12/1975 | Cadotte ...................... | 210/654 |
| 4,634,531 A | * | 1/1987 | Nakagawa et al. .......... | 210/639 |
| 5,039,752 A | * | 8/1991 | Storey et al. ................ | 525/314 |
| 5,108,879 A | * | 4/1992 | Abe et al. .................... | 430/429 |
| 5,672,438 A | | 9/1997 | Banerjee et al. | |
| 5,679,482 A | | 10/1997 | Ehrenberg et al. | |
| 6,124,060 A | | 9/2000 | Akita et al. | |
| 6,300,381 B1 | | 10/2001 | Kerres et al. | |
| 6,387,230 B1 | | 5/2002 | Murphy et al. | |
| 6,444,343 B1 | | 9/2002 | Prakash et al. | |
| 6,465,120 B1 | | 10/2002 | Akita et al. | |
| 6,478,987 B1 | | 11/2002 | Akita et al. | |
| 6,503,378 B1 | | 1/2003 | Fisher | |
| 6,523,699 B1 | | 2/2003 | Akita et al. | |
| 2004/0091415 A1 | * | 5/2004 | Yu et al. ................. | 423/445 R |
| 2005/0113547 A1 | * | 5/2005 | Li et al. ..................... | 528/30 |
| 2005/0118480 A1 | * | 6/2005 | Bauer et al. ................ | 429/33 |
| 2005/0164092 A1 | * | 7/2005 | Alberti et al. ............... | 429/306 |

FOREIGN PATENT DOCUMENTS

| | | | |
|---|---|---|---|
| JP | 56021604 A | * | 2/1981 |
| JP | 56021605 A | * | 2/1981 |
| JP | 62262711 A | * | 11/1987 |

* cited by examiner

*Primary Examiner*—Randy Gulakowski
*Assistant Examiner*—Michael M Bernshteyn
(74) *Attorney, Agent, or Firm*—Robert D. Katz; Cooper & Dunham LLP

(57) ABSTRACT

The present invention provides a polymer composite membrane having a polymer membrane and a poly(furfuryl alcohol) filling internal pores of the polymer membrane. The polymer composite membrane can have a high proton conductivity and/or a reduced methanol permeability and can be used in fuel cells, electrochemical sensor, and the like. The present invention also provides a method of making a polymer composite membrane, by providing a perfluorosulfonic polymer member, subjecting the perfluorosulfonic polymer member to a furan-based monomer, and polymerizing the furan-based monomer to obtain a polymer composite membrane having a high proton conductivity and/or a reduced methanol permeability.

16 Claims, 2 Drawing Sheets

POLYMER COMPOSITE MEMBRANE AND METHOD OF MAKING THE SAME

FIELD OF THE INVENTION

The present invention relates generally to a type of composite membrane and its synthesis. More specifically, the present invention relates to a nanocomposite membrane with low methanol permeability and high proton conductivity. In particular, the present invention relates to a nanocomposite membrane capable of improving the performance of direct methanol fuel cells. Moreover, the present invention relates to a method for making a nanocomposite membrane having low methanol permeability and high proton conductivity.

BACKGROUND OF THE INVENTION

Fuel cells are used to convert chemical energy of a fuel directly to electricity without going through combustion and the loss of efficiency due to the Carnot cycle limitation. Since there is no combustion in fuel cells, environmental benefits are obvious. Fuel cells can also be used in the deployment of renewal energy devices, such as wind or solar electricity generators, for storing the energy as fuel generated and transmitting the energy to a different location and at a different time.

There are various types of fuel cells. A common type of fuel cells is hydrogen-oxygen fuel cells, in which hydrogen is used as fuel and is combined with oxygen to form water. Methanol fuel cells have also been used in various power devices. For example, direct methanol fuel cells can be used to replace existing batteries in portable electronic products, such as notebook computers and mobile phones.

Typically, direct methanol fuel cells use a polymer electrolyte membrane between anode and cathode to separate the anode and cathode contents, preventing internal electronic current between the two electrodes and providing ionic conductivity within the fuel cell. For example, Nafion®, a perfluorosulfonic polymer, is a commonly used proton electrolyte membrane for fuel cells. This type of fuel cells is referred to as polymer electrolyte membrane (PEM) fuel cells. They can be used in operations under room temperature to moderate temperature (below about 180° C.).

Various attempts have been made to develop a polymer electrolyte membrane having a low methanol permeability, such as by synthesizing a new type of polymer to replace Nafion, or by modifying Nafion to form a composite membrane. However, such attempts can either undesirably affect proton conductivity, incur additional costs, or cause instability, hindering their practical applications in direct methanol fuel cells.

The present invention provides a composite membrane with a low methanol permeability and high proton conductivity. In particular, the present invention provides a nanocomposite membrane capable of improving the performance of direct methanol fuel cells. The present invention also relates to a method for making a composite membrane having low methanol permeability and high proton conductivity.

BRIEF DESCRIPTION OF THE DRAWINGS

The detailed description of the present invention will be better understood in conjunction with the accompanying drawings, in which.

DETAILED DESCRIPTION OF THE INVENTION

According to one aspect of the present invention, a polymer composite membrane is provided. In one embodiment, the polymer composite membrane can comprise a polymer member and a poly(furfuryl alcohol) filling internal pores of the polymer member. The polymer composite membrane of the present invention can have a high proton conductivity and/or a reduced methanol permeability.

The polymer composite membranes of the present invention can be in various forms. In one exemplary embodiment, the polymer member of the polymer composite membrane can comprise a proton conducting ionomer. For example, the polymer membrane comprises a perfluorosulfonic polymer, such as a Nafion® or Flemion® polymer. In an exemplary embodiment, the polymer member can comprise a Nafion polymer. For example, the polymer composite membrane can be a Nafion-PFA membrane. Additionally or alternatively, the PFA content in the polymer composite membrane can vary. In an exemplary embodiment, the composite membrane can contain about 2.0% by weight of poly(furfuryl alcohol). One skilled in the art will appreciate that the composite membrane can be in various other forms, which are also within the scope of the present invention.

The polymer composite membranes of the present invention, such as Nafion-PFA composite membranes, outperform conventional Nafion membranes by more than a factor of two in the presence of methanol. Conventional polymeric modifications to Nafion usually involve blend of polymers into the Nafion matrix and in effect filling either the hydrophillic or hydrophobic domains of the microstructures. Table 1 shows the reduced proton conductivity and methanol permeability of exemplary Nafion-PFA composite membranes having varied PFA weight percentages in comparison to a conventional Nafion membrane.

Figure 3:
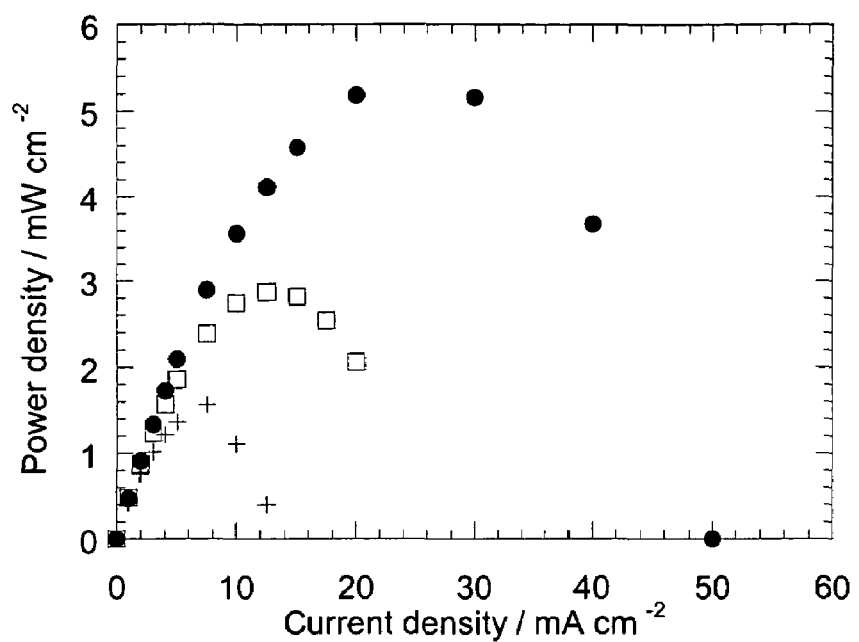
FIG. 3 shows the ambient air, room temperature performance of a MEA made with unmodified Nafion 115 membrane (shown in crosses) and two Nafion 115 membranes modified with 4.7% (shown in solid circles) and 7.0% (shown in open squares) of PFA.
Figure 4:
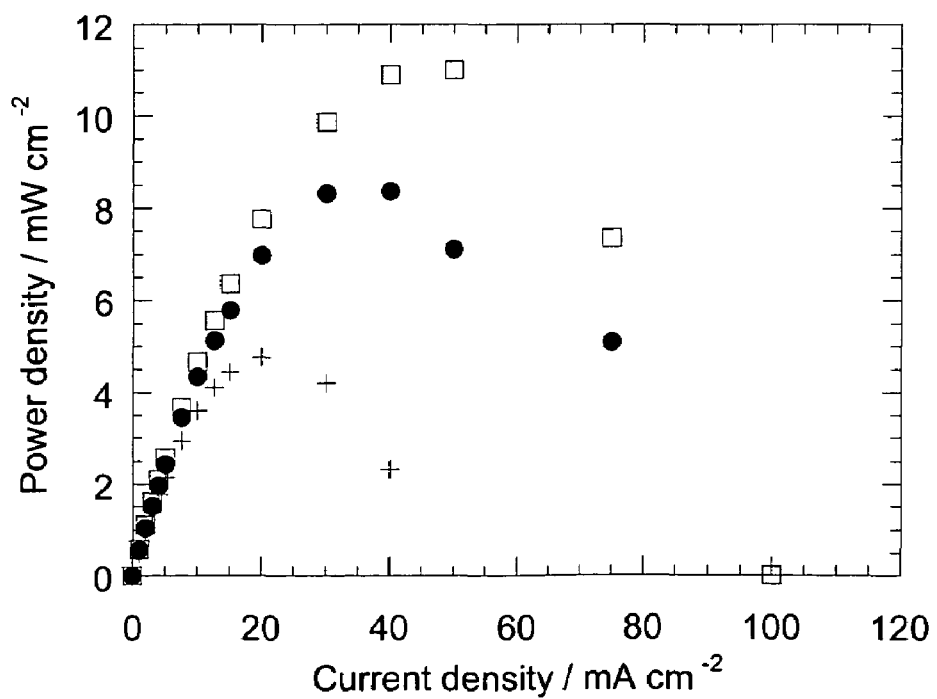
FIG. 4 shows the ambient air, 60° C. performance of a MEA made with unmodified Nafion 115 membrane (shown in crosses) and two Nafion 115 membranes modified with 4.7% (shown in solid circles) and 7.0% (shown in open squares) of PFA.

The actual performance of the Nafion-PFA composite membrane in an anode-membrane-cathode assembly (MEA) with 10% (vol) methanol in water as fuel under ambient air at room temperature and at an elevated temperature is shown in FIGS. 3 and 4, respectively. The peak power density in the PFA modified MEA is more than two times higher than the MEA using an unmodified Nafion membrane.

According to another aspect of the present invention, a method is provided for making a polymer composite membrane. In one embodiment, the method of making a polymer composite membrane can comprise providing a perfluorosulfonic polymer member, subjecting the perfluorosulfonic polymer member to a furan-based monomer, and polymerizing the furan-based monomer to obtain a polymer composite membrane. The polymer composite membrane formed can have a high proton conductivity and/or a reduced methanol permeability.

Various perfluorosulfonic polymer members and/or furan-based monomers can be used to form the composite membrane. For example, the perfluorosulfonic polymer member comprises a Nafion® polymer. Additionally or alternatively, the furan-based monomers can comprise furfuryl alcohol and furfuryl alcohol derivatives. In one exemplary embodiment, the furan-based monomers can comprise a halogen substituted furfuryl alcohol. In another exemplary embodiment, the furan-based monomers can comprise one or more furfuraldehyde and corresponding substituted derivatives.

The method can be carried out under various conditions. In one exemplary embodiment, the polymerization can be carried out under an elevated temperature. In another exemplary embodiment, the polymerization can be carried out using an acid catalyst. In a further exemplary embodiment, the polymerization procedure can be repeated to increase the final PFA weight percentage.

In another embodiment, the polymer composite membrane can be formed by in situ polymerization of a hydrophillic monomer. In an exemplary embodiment, the polymerization can be carried out under one or more conditions, such as elevated temperature, or using acid catalysis or iodine in methylene chloride. In another exemplary embodiment, the polymer composite membrane can be formed by in situ polymerization of an initially hydrophillic monomer, furfuryl alcohol to form the more hydrophobic poly(furfuryl alcohol) (PFA) within the polymer membrane porous domains. Furfuryl alcohol monomer is miscible with water, alcohol, and their mixtures and can be readily incorporated into hydrophilic zones of the internal pores of Nafion. In another exemplary embodiment, after acid catalyzed polymerization, the Nafion-PFA membrane becomes more hydrophobic.

Polymerization and change of hydrophobicity can alter the microstructures and nanostructures of the polymer membrane and make it more impermeable to methanol. In an exemplary embodiment, a homogenous Nafion-PFA nanocomposite membrane is obtained, which is demonstrated to be highly impermeable to methanol. Additionally or alternatively, Nafion-PFA membranes are chemically stable and relatively inexpensive.

The present invention will now be described in connection with various examples, which are used for purpose of illustration and shall not be considered limiting the present invention in any manner.

EXAMPLE 1

A commercial Nafion 115 membrane was first sodium exchanged by boiling in 0.5 M NaOH solution and rinsed with deionized water. The dried membrane with an area of 2 cm×2 cm was immersed in a mixture of 6 g furfuryl alcohol (FA, 98%, Lancaster), 12 g isopropanol, and 6 g deionized water. The fully swollen and saturated Nafion membrane was transferred into 1.0 M sulphuric acid at room temperature for 2 min. Subsequently, the polymerization of furfuryl alcohol was carried out at 80° C., such as in an oven. The membrane was washed with deionized water and boiled with 1.0M sulphuric acid to obtain the acidic form. The dark brown membrane was finally treated at 140° C. for 10 min allowing for microstructural rearrangements of the membrane. The resulting PFA-Nafion membrane contains approximately 2.0% by weight of PFA.

If desired, the monomer loading and polymerization procedure can be repeated to increase the final PFA weight percentage to the desirable level. For example, a second polymerization procedure can be carried out. In an exemplary embodiment, the second polymerization can be carried out at a higher temperature, such as 100° C. to 150° C. In another exemplary embodiment, the second polymerization can be carried out without using a catalyst. In a further exemplary embodiment, the second polymerization can be carried out using iodine in methylene chloride.

The microstructures of Nafion 115 membrane and Nafion-PFA nanocomposite membrane were examined, such as with a scanning electron microscope. In an exemplary embodiment, the membranes were freeze-fractured in liquid $N_2$ for SEM observations. A low voltage (such as 5 kV) was operated to lower electron beam energy and avoid damage to the membranes.

Figure 1:
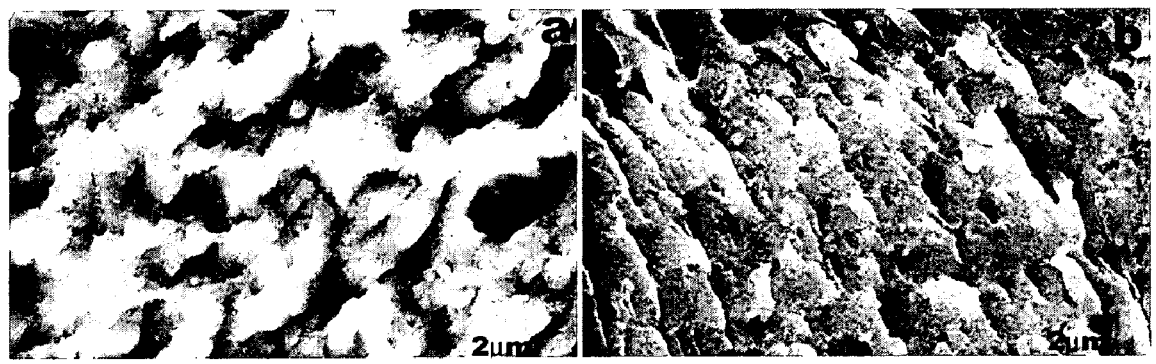
FIG. 1 shows SEM images of Nafion 115 membrane and Nafion-PFA nanocomposite membranes, wherein the left micrograph is a Nafion 115 membrane and the right micrograph is a Nafion-5.4PFA membrane.

FIG. 1 shows representative cross-sectional images of the samples. For example, a protruded or rugged texture is observed from the plain Nafion 115 membrane, such as shown in FIG. 1a. As is shown in FIG. 1b, flake-interlaced compact morphology develops when PFA is incorporated and/or uniformly dispersed in Nafion structures. When the amount of PFA in the Nafion structures increases, the dimension of cluster aggregates evidently increases, and the thickness of interstitial regions in the Nafion structures significantly decreases.

ADDITIONAL EXAMPLES

By using the above procedure, Nafion-PFA nanocomposite membranes with different PFA contents were obtained. For example, Nafion-PFA nanocomposite membranes containing 1.0, 3.9, 5.4, 8.0, and 12.4 wt % PFA were prepared and denoted as Nafion-1.0PFA, Nafion-3.9PFA, Nafion-5.4PFA, Nafion-8.0PFA, and Nafion-12.4PFA, respectively. The proton conductivity and the methanol permeability of Nafion 115 membrane and exemplary Nafion-PFA nanocomposite membranes with different PFA amounts were measured at room temperature and shown in the following Table 1:

TABLE 1

Proton Conductivity And Methanol Permeability Of Nafion 115 And Exemplary Nafion-PFA Membranes Measured At Room Temperature

| Sample | Nafion 115 | Nafion-1.0PFA | Nafion-3.9PFA | Nafion-8.0PFA | Nafion-12.4PFA |
|---|---|---|---|---|---|
| Proton Conductivity (S/cm) | 0.0953 | 0.0848 | 0.0891 | 0.0704 | 0.0558 |
| Methanol Permeability ($\mu mol/cm^2 min$) | 4.66 | 2.69 | 2.16 | 1.72 | 4.35 |

The proton conductivity of Nafion 115 membrane and Nafion-PFA nanocomposite membranes can be obtained by measuring membrane impedance at room temperature using various conventional methods, such as those described in the literature by Müller and Urban. For example, the membrane was fixed in an electrochemical cell connected to an AUTO-LAB FRA2 impedance analyzer. As shown in Table 1, the proton conductivity of the membranes decreases while PFA is incorporated. The proton conductivity drops by 11.02%, 6.51%, 26.13%, and 41.45% for Nafion-1.0PFA, Nafion-3.9PFA, Nafion-8.0PFA, and Nafion-12.4PFA, respectively, as compared to a plain Nafion 115 membrane.

The methanol permeability of Nafion 115 and Nafion-PFA nanocomposite membranes can be measured by various conventional methods, such as a potentiometric method recently reported in the literature by Munichandraiah et al. The oxygen cathode polarization was monitored as a function of time when methanol was introduced into the anodic compartment and slowly permeated through the membrane.

In one exemplary embodiment, the membrane was clamped between the two compartments of a permeation cell. The two compartments were kept stirred, such as using magnetic stir bars, during experiments. The required volume of a solution of 1 M methanol and 0.5 M $H_2SO_4$ in deionized $H_2O$ was added to one compartment. An equal volume of a solution of 0.5 M $H_2SO_4$ in deionized $H_2O$ was added to the other compartment. The potential of a Pt/C gas diffusion electrode against a Ag/AgCl, KCl (3 M) reference electrode was recorded, such as by a Radiometer Copenhagen/Dynamic-Eis Voltalab PGZ301 potentiostat/galvanostat.

Figure 2:
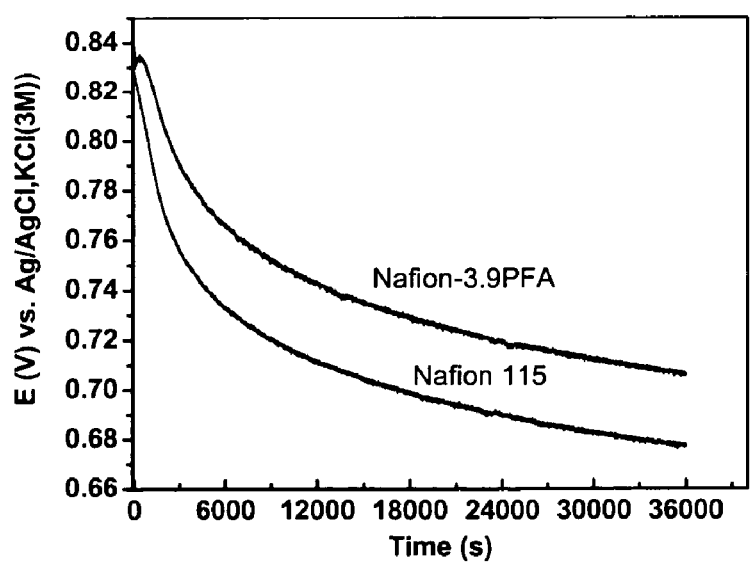
FIG. 2 shows the declines of open circuit potential of an oxygen cathode after introduction of methanol to the anode chamber with a Nafion membrane (lower curve) and a PFA modified Nafion membrane (upper curve).

FIG. 2 shows the variation of potential as a function of permeation time for Nafion 115 and Nafion-3.9PFA. The methanol permeability was determined by measuring a standard curve of potential shift against methanol concentration. As shown in FIG. 2, the potential for Nafion-3.9PFA is much higher than that for plain Nafion 115. This indicates that the methanol crossover through Nafion-3.9PFA is reduced as compared to that of plain Nafion 115. The methanol crossover of Nafion membrane is suppressed by the PFA modification.

The reduction of methanol permeability varies with the amount of PFA incorporated in the membrane. As shown in Table 1, the methanol permeability drops by a factor of 1.7, 2.2, 2.7, and 1.1 for Nafion-1.0PFA, Nafion-3.9PFA, Nafion-8PFA, and Nafion-12.4PFA, respectively as compared to that of Nafion 115.

Examples of membrane-electrode assembly operation at different current loadings are now described below.

In one embodiment, the polymer composite membrane described above can be used to form a membrane-electrode assembly (MEA). In an exemplary embodiment, a cathode electrode was prepared by pasting a mixture of the required amount of the carbon-supported 60 wt % Pt catalyst (manufactured by E-TEK) and 5 wt % Nafion solution (Aldrich) onto a teflonized carbon cloth (manufactured by E-TEK) and drying in air at 80° C. for 1 h. In another exemplary embodiment, an anode electrode was prepared by pasting a mixture of the required amount of the carbon-supported 60 wt % $Pt_{50}Ru_{50}$ (manufactured by TANKA KIKINZOKU KOGYO K.K) and a binder 411 (4 parts of 1 wt % CMC, 1 part of 10 wt % PTFE and 1 part of SBR, in volume) onto a non-wet-proofing carbon cloth (manufactured by E-TEK) and drying in air at 80° C. for 1 h.

In another exemplary embodiment, one or both electrodes were coated with Nafion solution. In an exemplary embodiment, both electrodes were coated with 5 wt % Nafion solution (manufactured by ALDRICH) and dried at 80° C. The metal loadings in the cathode and anode electrodes were 2.5 mg $cm^{-2}$ and 2 mg $cm^{-2}$, respectively.

Membrane-electrode assemblies (MEAs) can be formed with the electrodes in various manners. In an exemplary embodiment, MEAs were fabricated by hot-pressing the made electrodes onto a pretreated Nafion membrane. For example, a MEA was formed by hot-pressing the made anode and cathode onto a poly(furfuryl alcohol) modified Nafion 115 membrane at 140° C. for 3 min. One skilled in the art will appreciate that various other methods can be used to form the electrodes and/or the MEAs, which methods are also within the scope of the present invention.

The performances of MEAs were evaluated with a self-made single cell test system having 4 $cm^2$ active geometrical area, such as using a galvanostatic technique. For example, a 10 vol % methanol solution was supplied to the anode at 10 ml/min and an atmospheric dry air was flowed to the cathode. The performance of the MEAs at room temperature and 60° C. is shown in FIGS. 3 and 4, respectively. Membrane-electrode assemblies formed with modified membranes have an improved power density comparing to that formed with unmodified Nafion 115 membrane.

It will be appreciated by one skilled in the art that the present invention can be used in various industrial applications including, but not limited to, electrodes, membrane-electrode assemblies, fuel cells (including direct methanol fuel cells) as power sources in portable electronic devices (such as notebook computers, mobile phones, PDAs, iPods, etc.), electrochemical sensors, and the like.

It will be appreciated that the various features described herein may be used singly or in any combination thereof. Therefore, the present invention is not limited to only the embodiments specifically described herein. While the foregoing description and drawings represent a preferred embodiment of the present invention, it will be understood that various additions, modifications, and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiment is therefore to be considered in all respects as illustrative and not restrictive, the scope of the invention being indicated by the appended claims, and not limited to the foregoing description.

What is claimed is:

1. A method of making a polymer composite membrane, the method comprising:
   providing a perfluorosulfonio polymer member;
   subjecting the perfluorosulfonic polymer member to a furan-based monomer including furfuryl alcohol and furfuryl alcohol derivatives; and
   polymerizing the furan-based monomer to obtain a polymer composite membrane having a polyfurfuryl alcohol content from about 2% to 12.4%;
   whereby the polymer composite membrane formed has a high proton conductivity and reduced methanol permeability.

2. The method of claim 1, wherein the perfluorosulfonic polymer member comprises a sulfonated tetrafluorethylene polymer.

3. The method of claim 1, wherein the polyfurfuryl alcohol content of the polymer composite membrane is 8%.

4. The method of claim 1, wherein the furan-based monomer comprises a halogen substituted furfuryl alcohol.

5. The method of claim 3, wherein the furfuryl alcohol derivative comprises one or more furfuraldehyde and corresponding substituted derivatives.

6. The method of claim 1, wherein polymerization is carried out using an acid catalyst.

7. The method of claim 1, further comprising a second polymerization carried out at an elevated temperature.

8. The method of claim 1, further comprising a second polymerization carried out using iodine in methylene chloride.

9. A method of making a polymer composite membrane, the method comprising:
- providing a perfluorosulfonic polymer member;
- subject the perfluorosulfonic polymer member to a furan-based monomer including furfuryl alcohol and furfuryl alcohol derivatives; and
- polymerizing the furan-based monomer to obtain a polymer composite membrane having from about 2% to 12.4% polyfurfuryl alcohol content;
- whereby the polymer composite membrane formed is capable of selectively conducting ions to increase proton conductivity and reducing methanol permeability.

10. The method of claim 9, wherein the polymer composite membrane formed has a proton conductivity of about 0.0558 S/cm.

11. The method of claim 9, wherein the polymer composite membrane formed has a reduced methanol permeability of about 4.35 μmol/cm$^2$min or less.

12. The method of claim 9, wherein the polymer composite membrane formed has a proton conductivity of about 0.0558 S/cm or more and a reduced methanol permeability of about 4.35 μmol/cm$^2$min or less, and the polyfurfuryl alcohol content of the polymer composite membrane is about 2% to 12.4%.

13. A method of making a fuel cell membrane, comprising:
- providing a perfluorosulfonic polymer member;
- subjecting the perfluorosulfonic polymer member to a furan-based monomer including furfuryl alcohol and furfuryl alcohol derivatives; and
- polymerizing the furan-based monomer to obtain a polymer composite membrane having a polyfurfuryl alcohol content of 8%;
- whereby the polymer composite membrane formed has a high proton conductivity and reduced methanol permeability.

14. The method of claim 13, wherein the polymer composite membrane formed has a proton conductivity of about 0.0558 S/cm.

15. The method of claim 13, wherein the polymer composite membrane formed has a reduced methanol permeability of about 4.35 μmol/cm$^2$min or less.

16. The method of claim 13, wherein the polymer composite membrane formed has a proton conductivity of about 0.0558 S/cm or more and a reduced methanol permeability of about 4.35 μmol/cm$^2$min.

* * * * *